(12) United States Patent
Takemoto

(10) Patent No.: US 9,857,843 B2
(45) Date of Patent: Jan. 2, 2018

(54) ELECTRONIC APPARATUS

(71) Applicant: Japan Display Inc., Tokyo (JP)

(72) Inventor: Kimiyoshi Takemoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 171 days.

(21) Appl. No.: 14/876,125

(22) Filed: Oct. 6, 2015

(65) Prior Publication Data

US 2016/0143169 A1    May 19, 2016

(30) Foreign Application Priority Data

Nov. 13, 2014    (JP) ................................ 2014-230791

(51) Int. Cl.
*H05K 1/00*    (2006.01)
*G06F 1/16*    (2006.01)

(52) U.S. Cl.
CPC .......... *G06F 1/1637* (2013.01); *G06F 1/1601* (2013.01); *G06F 2200/1612* (2013.01)

(58) Field of Classification Search
CPC .......... G06F 1/184; G06F 1/616; G06F 1/626; G06F 1/638; H05K 1/181; H05K 1/118; H05K 1/189; H05K 7/1409
USPC ......... 361/679.27–29, 3, 749, 754–759, 814; 174/254
See application file for complete search history.

(56) References Cited

U.S. PATENT DOCUMENTS

| 2006/0152664 A1* | 7/2006 | Nishio | G02F 1/13452 349/150 |
| 2009/0147487 A1* | 6/2009 | Morimoto | H05K 1/147 361/760 |
| 2011/0090652 A1* | 4/2011 | Wee | H05K 5/069 361/749 |
| 2014/0177147 A1* | 6/2014 | Teramoto | H05K 13/00 361/679.01 |

FOREIGN PATENT DOCUMENTS

JP    2007-060323    3/2007

* cited by examiner

*Primary Examiner* — Tuan T Dinh
(74) *Attorney, Agent, or Firm* — K&L Gates LLP

(57) ABSTRACT

An electronic apparatus includes: an electronic component; a housing that has an accommodation space for accommodating the electronic component, and has an opening communicating with the accommodation space, the opening being provided at part of an outer member enclosing the accommodation space; a covering member that covers the opening and is in intimate contact with the outer member of the housing at a position enclosing the entire outer circumference of the opening and that has a slit provided at a position opposed to the opening; and a flexible printed circuit board including a first end and a second end, the first end being electrically coupled to the electronic component, the second end being drawn out to the outside of the accommodation space through the slit.

6 Claims, 6 Drawing Sheets

ELECTRONIC APPARATUS

CROSS REFERENCES TO RELATED APPLICATIONS

The present application claims priority to Japanese Priority Patent Application JP 2014-230791 filed in the Japan Patent Office on Nov. 13, 2014, the entire content of which is hereby incorporated by reference.

BACKGROUND

1. Technical Field

The present invention relates to an electronic apparatus.

2. Description of the Related Art

In electronic apparatuses such as a liquid crystal display device, an electronic component accommodated inside a housing may be electrically coupled to another electronic component disposed outside the housing via a flexible printed circuit board (hereinafter, abbreviated as an "FPC") in some cases. In this case, an end of the FPC that is electrically coupled to the electronic component accommodated inside the housing is drawn out through an opening provided to an outer member of the housing to be electrically coupled to another electronic component disposed outside the housing (refer to Japanese Patent Application Laid-open Publication No. 2007-60323).

In the above configuration, to enhance dustproof properties of the inside of the housing, it can be considered that the opening is covered with a covering member in a state in which one end of the FPC is drawn out through the opening of the housing. The covering member is bonded to the outer member of the housing from above the FPC in a state in which the FPC is disposed along the outer member of the housing. In this configuration, to couple the FPC to another electronic component, the end of the FPC needs to be lifted up in a direction separated from the housing and largely rotated about a portion fixed with the covering member. However, when such an operation is performed, the covering member may be peeled off and the dustproof properties of the inside of the housing may be impaired.

For the foregoing reasons, there is a need for an electric apparatus that can prevent dustproof properties of the inside of a housing from being impaired.

SUMMARY

According to an aspect, an electronic apparatus includes: an electronic component; a housing that has an accommodation space for accommodating the electronic component, and has an opening communicating with the accommodation space, the opening being provided at part of an outer member enclosing the accommodation space; a covering member that covers the opening and is in intimate contact with the outer member of the housing at a position enclosing the entire outer circumference of the opening and that has a slit provided at a position opposed to the opening; and a flexible printed circuit board including a first end and a second end, the first end being electrically coupled to the electronic component, the second end being drawn out to the outside of the accommodation space through the slit.

Additional features and advantages are described herein, and will be apparent from the following Detailed Description and the figures.

DETAILED DESCRIPTION

Figure 1:
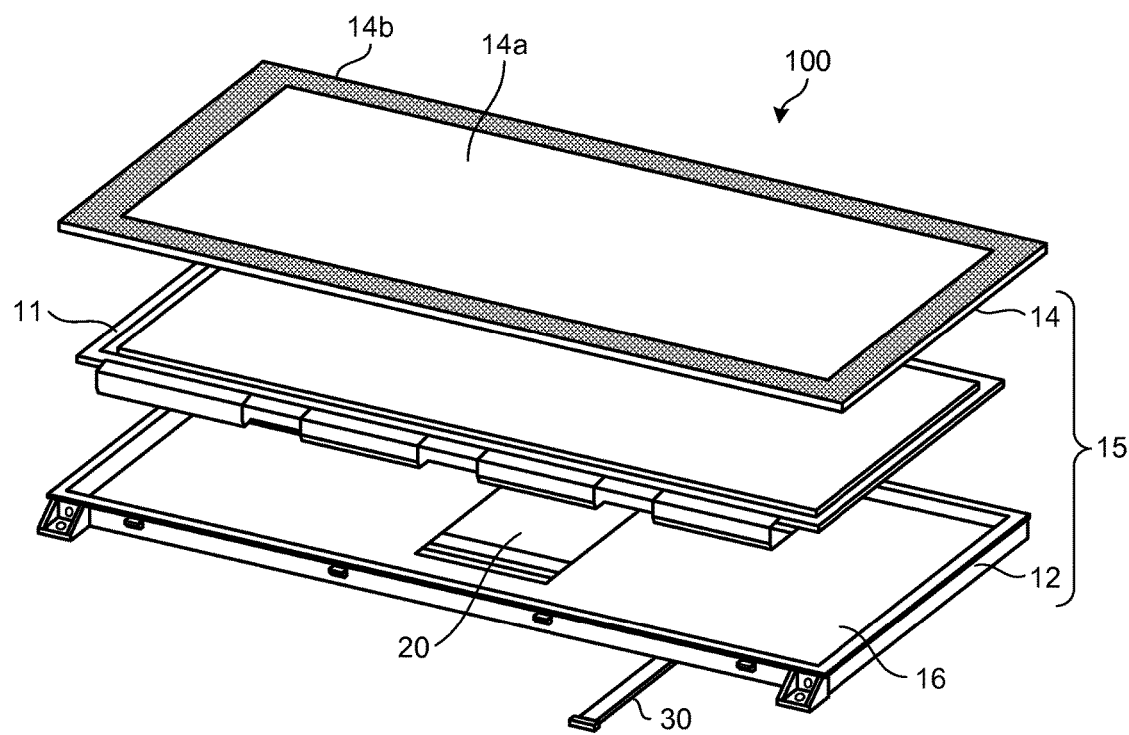
FIG. 1 is a schematic configuration diagram of an electronic apparatus according to an embodiment.

The following describes an embodiment in detail with reference to the drawings. The present invention is not limited to the embodiment described below. Components described below include a component that is easily conceivable by those skilled in the art and substantially the same component. The components described below can be appropriately combined. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

FIG. 1 is a schematic configuration diagram of an electronic apparatus 100 according to the embodiment. The electronic apparatus 100 according to the embodiment includes an electronic component 11, a housing 15, an FPC 20, and an FPC 30.

The electronic component 11 is, for example, a display unit including a liquid crystal panel and a backlight. The FPC 20 is electrically coupled to the liquid crystal panel of the electronic component 11. The FPC 30 is electrically coupled to the backlight of the electronic component 11. The electronic component 11 is accommodated in the housing 15. The housing 15 includes an accommodation space 16 for accommodating the electronic component 11. The housing 15 is, for example, constituted of an accommodating case 12 and a cover plate 14. The electronic component 11 is optically bonded to a center part 14a of the cover plate 14, and an edge of the cover plate 14 on which a light-blocking part 14b is disposed is joined to the accommodating case 12. A space enclosed by the accommodating case 12 and the cover plate 14 is the accommodation space 16.

A plurality of openings communicating with the accommodation space 16 are provided to part of an outer member of the housing 15 enclosing the accommodation space 16. The openings are provided corresponding to the FPC 20 and the FPC 30, respectively. The FPC 30 is, for example, drawn out to the outside of the accommodation space 16 through an opening 13 illustrated in FIG. 3. Although not illustrated, the FPC 20 is drawn out to the outside of the accommodation space 16 through an opening different from the opening 13.

Figure 2:
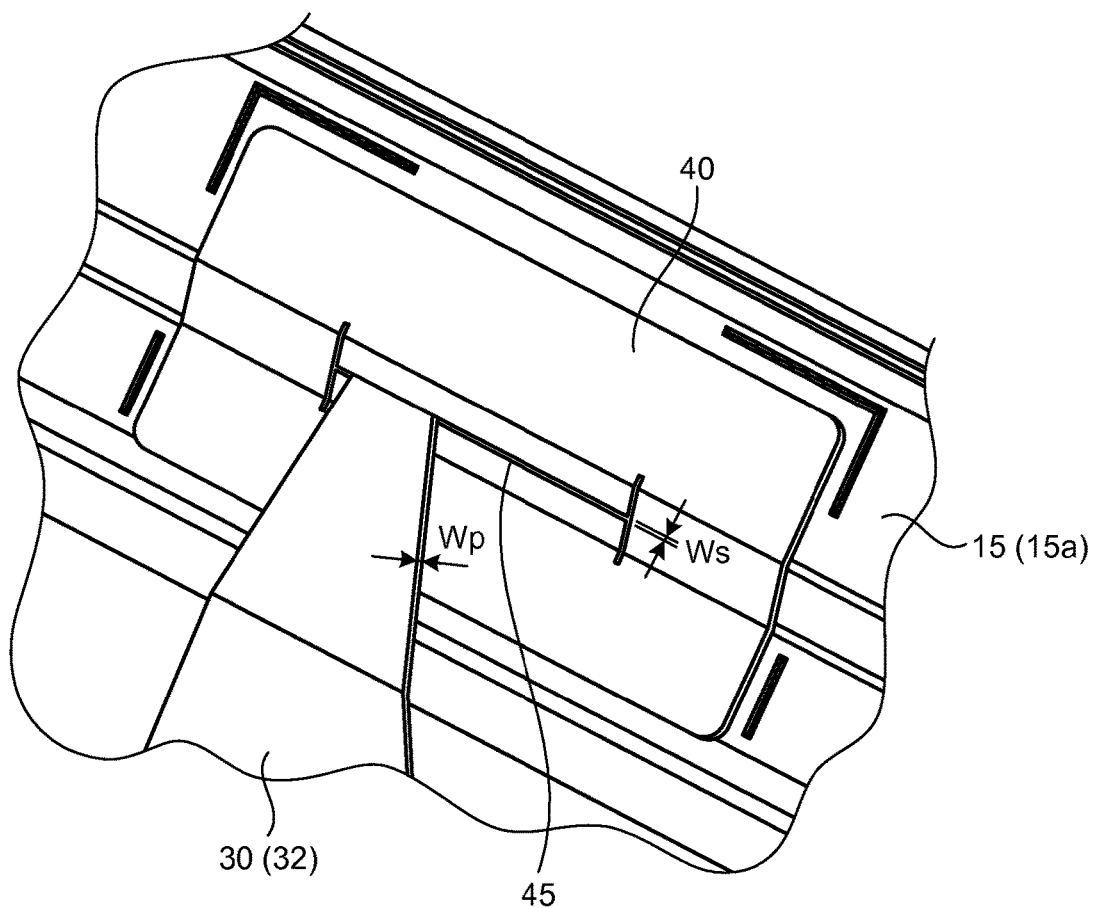
FIG. 2 is a diagram illustrating a configuration in the vicinity of an opening viewed from the outside of a housing.
Figure 3:
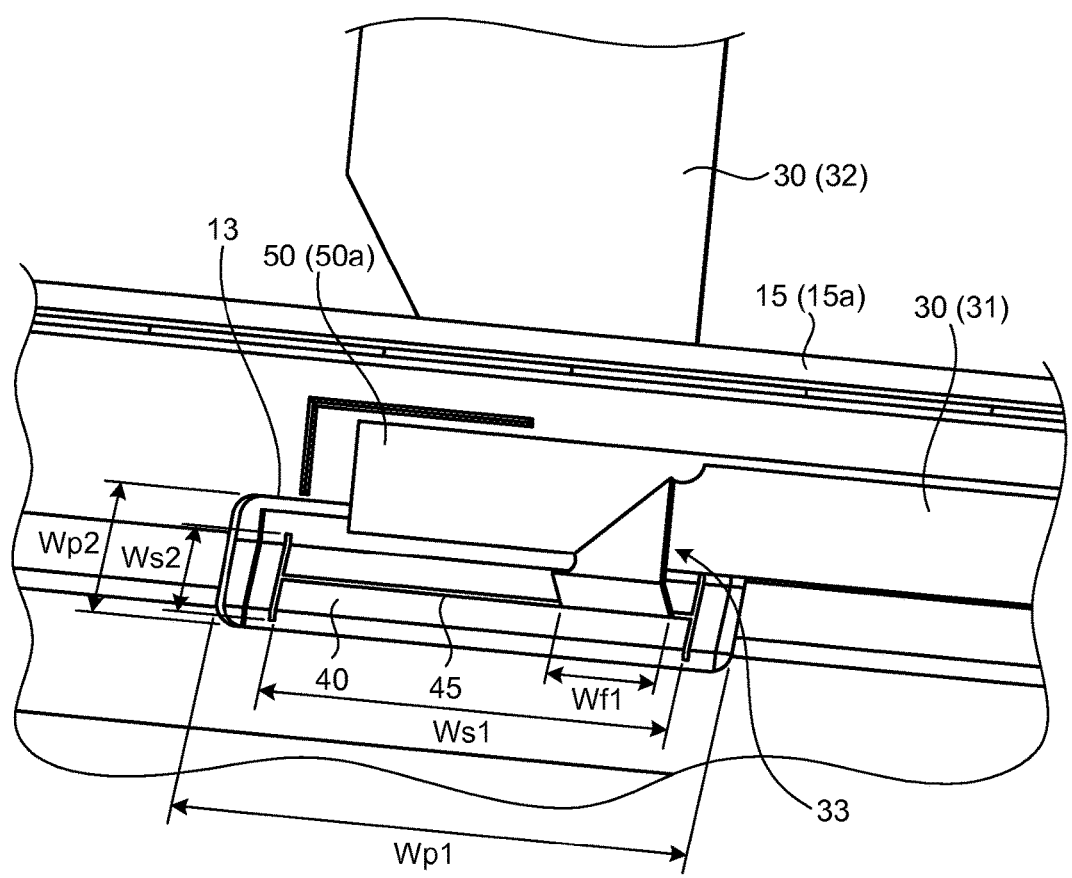
FIG. 3 is a diagram illustrating the configuration in the vicinity of the opening viewed from the inside of the housing.

FIG. 2 is a diagram illustrating a configuration in the vicinity of the opening 13 viewed from the outside of the housing 15 (outside of the accommodation space 16). FIG. 3 is a diagram illustrating the configuration in the vicinity of the opening 13 viewed from the inside of the housing 15 (accommodation space 16 side). Hereinafter, a surface on an outer side (external side) of an outer member 15a of the housing 15 is referred to as an outer face, and a surface on an inner side (accommodation space 16 side) of the outer member 15a of the housing 15 is referred to as an inner face.

The electronic apparatus 100 according to the embodiment includes a covering member 40. The covering member 40 covers the opening 13 and is in intimate contact with the outer member 15a of the housing 15 at a position enclosing the entire outer circumference of the opening 13. The covering member 40 is, for example, in intimate contact with the outer face of the outer member 15a. A slit 45 is provided to the covering member 40 at a position opposed to the opening 13. A first end 31 of the FPC 30 is electrically coupled to the electronic component 11, and a second end 32 thereof is drawn out to the outside of the accommodation space 16 through the slit 45. The opening 13 is closed by the covering member 40, which prevents dust from entering the accommodation space 16 from the outside of the housing 15.

The covering member 40 is made of, for example, a flexible member. Accordingly, when the FPC 30 drawn out from the slit 45 is pulled along the outer face of the outer member 15a or pulled in a direction to be obliquely bent with respect to the outer face, a force applied to the FPC 30 from the covering member 40 can be reduced.

As illustrated in FIG. 3, an edge cover 50 that covers at least part of an edge of the opening 13 is disposed on a second surface opposite to a first surface that is in contact with the covering member 40 of the outer member 15a of the housing 15 (in the embodiment, for example, the inner face of the outer member 15a). The FPC 30 is drawn out to the outside along a first surface of the edge cover 50. Accordingly, the FPC 30 is prevented from being rubbed against the edge of the opening 13.

For example, a bonding layer (second bonding layer) 50a is disposed on a first surface of the edge cover 50 opposite to a second surface of the edge cover 50, the second surface of the edge cover 50 being in contact with the outer member 15a. The bonding layer 50a bonds part of the FPC 30 positioned inside the accommodation space 16 to the edge cover 50 such that the part of the FPC 30 is fixed onto the edge cover 50. The edge cover 50 has a belt-like shape and extends from the vicinity of the electronic component 11 to the opening 13, and part of the edge cover 50 disposed near the opening 13 covers the edge of the opening 13. The FPC 30 is routed on the outer member 15a of the housing 15 along the edge cover 50, is bent in a vicinity 33 of the opening 13, and passes through the slit 45. Accordingly, the FPC 30 is prevented from interfering with a structure inside the housing 15.

Figure 4:
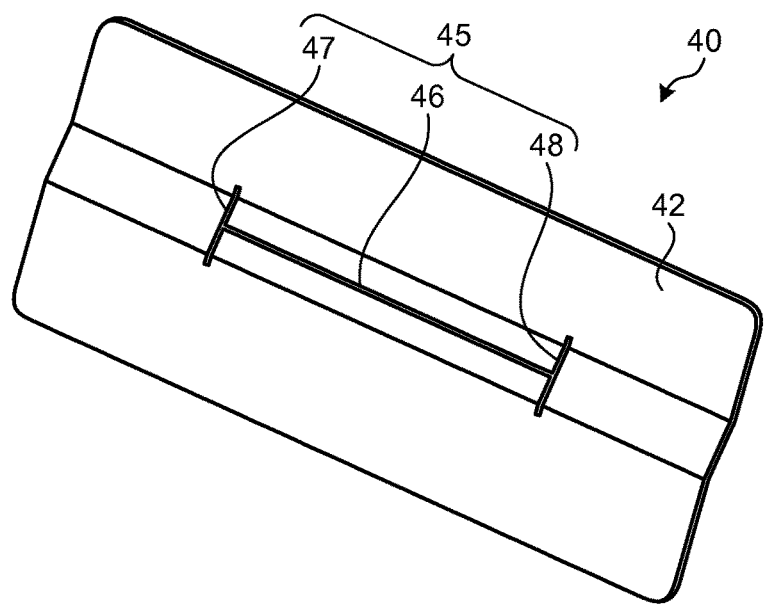
FIG. 4 is a diagram illustrating a covering member viewed from an opposite side of a side being in contact with an outer member.
Figure 5:
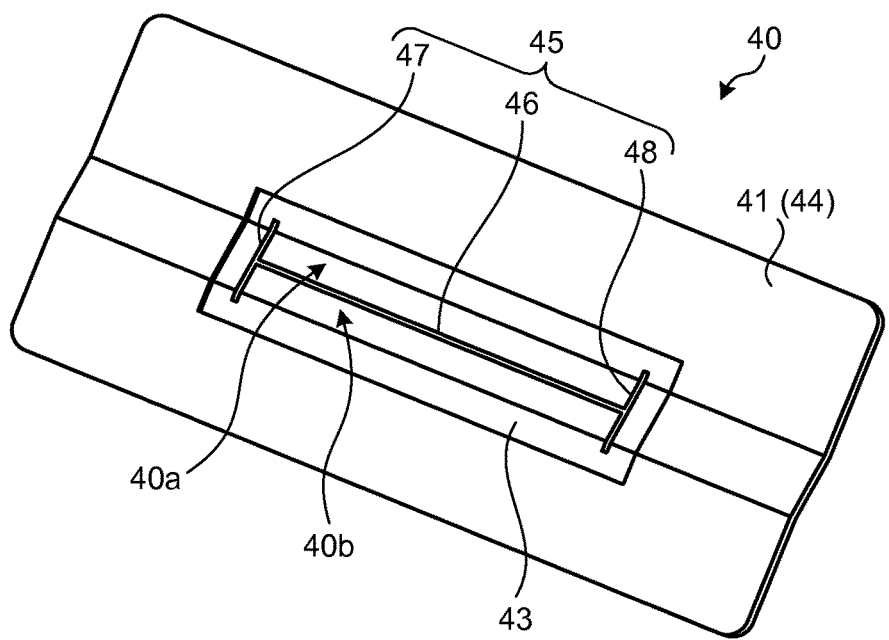
FIG. 5 is a diagram illustrating the covering member viewed from the side being in contact with the outer member.

FIGS. 4 and 5 are diagrams illustrating an example of the configuration of the covering member 40. FIG. 4 is a diagram illustrating the covering member 40 viewed from an opposite side of a side being in contact with the outer member 15a. FIG. 5 is a diagram illustrating the covering member 40 viewed from the side being in contact with the outer member 15a.

The covering member 40 includes, for example, a bonding layer (first bonding layer) 41 and a protective film 42. The bonding layer 41 has an opening 43 at a position opposed to the opening 13 of the outer member 15a. The protective film 42 is bonded to a surface of the bonding layer 41 opposite to the side being in contact with the outer member 15a to close the opening 43 of the bonding layer 41. The bonding layer 41 is bonded to the outer member 15a via a bonding surface 44 exposed around the opening 43. As the bonding layer 41, for example, a double-sided bonding film is used. However, the embodiment is not limited thereto. The bonding layer 41 may be made of a layer including only glue. As the protective film 42, for example, a PET film is used. However, the embodiment is not limited thereto. The protective film 42 may be any film without glue.

The slit 45 is disposed on the protective film 42 disposed at a position opposed to the opening 43 of the bonding layer 41. The slit 45 includes, for example, a linear part 46, a first intersection part 47, and a second intersection part 48. The linear part 46 extends in parallel with a longitudinal direction of the opening 13, for example. The first intersection part 47 and the second intersection part 48 intersect with a first end and a second end of the linear part 46, respectively. Due to this, the slit 45 is shaped in an H-shape. The first intersection part 47 and the second intersection part 48 may be shaped in a linear shape, or may be bent.

As illustrated in FIG. 2, for example, a width Ws of the slit 45 is set to be equal to or smaller than a thickness Wp of the FPC 30 that passes through the slit 45. To enhance the dustproof properties, the width Ws of the slit 45 is preferably made as small as possible. The slit 45 is disposed at the center part of the opening 13 not to protrude to the outside of the opening 13. As illustrated in FIG. 3, a length Ws1 of the linear part 46 is larger than a width Wf1 of part of the FPC 30 that passes through the linear part 46, and is smaller than a length Wp1 of the opening 13 in the longitudinal direction. A length Ws2 of the first intersection part 47 and the second intersection part 48 in a direction parallel with a lateral direction of the opening 13 is smaller than a length Wp2 of the opening 13 in the lateral direction.

Due to the slit 45 shaped in an H-shape, two regions (a region 40a and a region 40b) that can be flexibly deformed following the movement of the FPC 30 are provided on the covering member 40. Accordingly, when the FPC 30 drawn out from the slit 45 is pulled along the outer face of the outer member 15a or pulled in a direction to be obliquely bent with respect to the outer face, the covering member 40 is prevented from being subjected to a large force, and the covering member 40 hardly peels off from the housing 15.

The two regions (the region 40a and the region 40b) are provided at a part of the bonding layer 41 where the opening 43 is provided. Thus the thickness of the covering member 40 at the part where the two regions are provided is equal to the thickness of the protective film 42. Accordingly, flexibility of the two regions is further enhanced, and the covering member 40 is further prevented from peeling off when the FPC 30 is pulled. The FPC 30 is drawn out through the opening 43 of the bonding layer 41, so that the FPC 30 is prevented from being accidentally bonded to the bonding surface 44 of the bonding layer 41.

Figure 6:
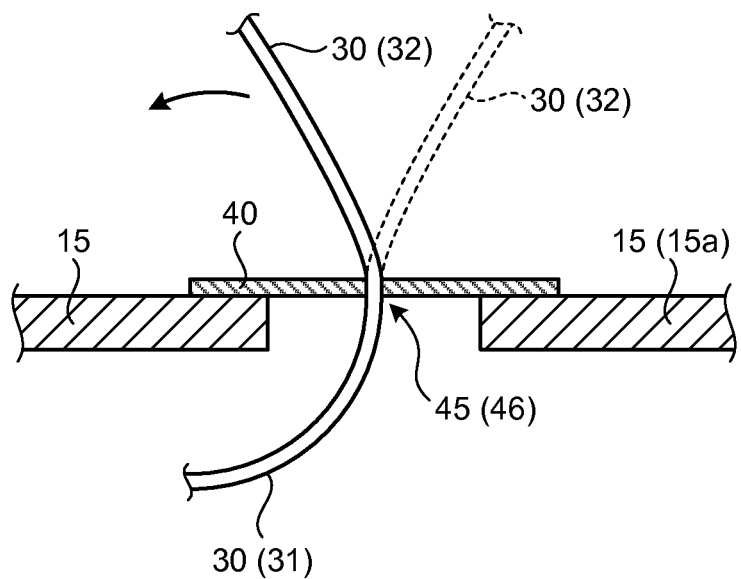
FIG. 6 is a diagram for explaining movement of an FPC and the covering member when the FPC is pulled along the outer member.
Figure 7:
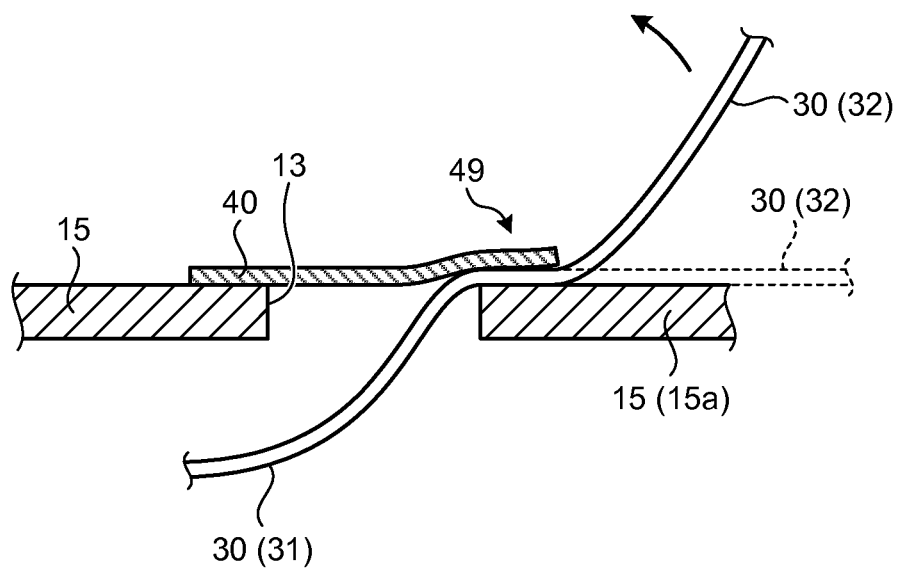
FIG. 7 is a diagram illustrating a comparative example in which the opening is covered with the covering member from above the FPC in a state in which an end of the FPC is drawn out through the opening.

FIG. 6 is a diagram for explaining movement of the FPC 30 and the covering member 40 when the FPC 30 is pulled along the outer member 15a. FIG. 7 is a diagram illustrating a comparative example in which the opening 13 is covered with the covering member 40 from above the FPC 30 in a state in which an end of the FPC 30 is drawn out through the opening 13. For convenience, in FIG. 6, the edge cover and the like are not illustrated.

In the example of FIG. 7, the covering member 40 is bonded to the outer member 15a from above the FPC 30 in a state in which the FPC 30 is disposed along the outer member 15a. Accordingly, to electrically couple the FPC 30 to another electronic component, the end of the FPC 30 needs to be lifted up in a direction separated from the outer member 15a and largely rotated about a portion 49 fixed with the covering member 40. However, when such an operation is performed, part of the covering member 40 that fixes the FPC 30 is subjected to a force in a peeling direction (a direction orthogonal to the outer face of the outer member 15a), and the covering member 40 may peel off. The FPC 30 needs to be handled carefully so that the dustproof properties of the inside of the housing 15 are not impaired.

On the other hand, in the configuration according to the embodiment illustrated in FIG. 6, the FPC 30 is drawn out to the outside through the slit 45 disposed on the covering member 40. Even when the FPC 30 is pulled along the outer member 15a, the force in the peeling direction is hardly applied to the covering member 40. Thus the covering member 40 hardly peels off, and the dustproof properties in the inside of the housing 15 are hardly impaired. According to the embodiment, the slit 45 is shaped in an H-shape, so that a force in a sliding direction (a direction parallel with the outer face of the outer member 15a) is hardly applied even when the FPC 30 moves to the left and the right. Accordingly, the covering member 40 more hardly peels off. Due to this, the FPC 30 can be handled more easily. For example, the electronic component 11 may be shipped in a state in which the FPC 30 is fixed to the surface of the left outer member 15a illustrated in FIG. 6, and may be coupled to another electronic apparatus to be used in a state in which the FPC 30 is in contact with the surface of the right outer member 15a illustrated in FIG. 6.

As illustrated in FIG. 6, the FPC 30 according to the embodiment is routed on the outer member 15a of the housing 15 along the edge cover 50, is bent in the vicinity 33 of the opening 13, and passes through the slit 45. Thus an angle at which the FPC 30 is inserted into the slit 45 with respect to the covering member 40 is closer to a normal line to the surface of the covering member 40. As a result, as illustrated in FIG. 6, movement of the FPC 30 inside the housing 15 is suppressed even when the FPC 30 outside the housing 15 moves to the left and the right. Even if the movement of the FPC 30 inside the housing 15 is transmitted, distortion of the FPC 30 that is bent in the vicinity 33 of the opening 13 suppresses vibration, and a stress applied to the FPC 30 that is fixed to the edge cover 50 is reduced.

Although not illustrated, a covering member and an edge cover that are similar to, respectively, the covering member 40 and the edge cover 50 provided to the opening 13 are provided to an opening corresponding to the FPC 20 illustrated in FIG. 1.

As described above, in the electronic apparatus 100 according to the embodiment, the dustproof properties of the inside of the housing 15 are hardly impaired even when the FPC 30 and the FPC 20 are largely moved. Accordingly, handling of the FPC 30 and the FPC 20 is facilitated, and coupling work between the electronic component 11 and another electronic component is also facilitated.

The preferred embodiment of the present invention has been described above. However, the present invention is not limited thereto. Content disclosed in the embodiment is merely an example, and various modifications can be made without departing from the gist of the invention. The present invention naturally encompasses an appropriate modification maintaining the gist of the invention.

For example, in the above embodiment, the covering member 40 is disposed on the outer face of the outer member 15a, and the edge cover 50 is disposed on the inner face of the outer member 15a. Alternatively, the covering member 40 may be disposed on the inner face of the outer member 15a, and the edge cover 50 may be disposed on the outer face of the outer member 15a. The slit 45 is shaped in an H-shape, but the shape of the slit 45 is not limited thereto. For example, the slit 45 may be shaped in various shapes such as a linear shape or a T-shape. The edge cover 50 is not necessarily required if the edge of the opening 13 is smooth. The configuration of the covering member 40 is not limited to the configuration in which the protective film 42 is attached to one surface of the bonding layer 41 having the opening 43. Alternatively, the configuration may be such that the protective film is disposed on part of the bonding layer of a single-sided bonding film, and the slit is provided at a portion where the protective film is disposed.

Application Example

Figure 8:
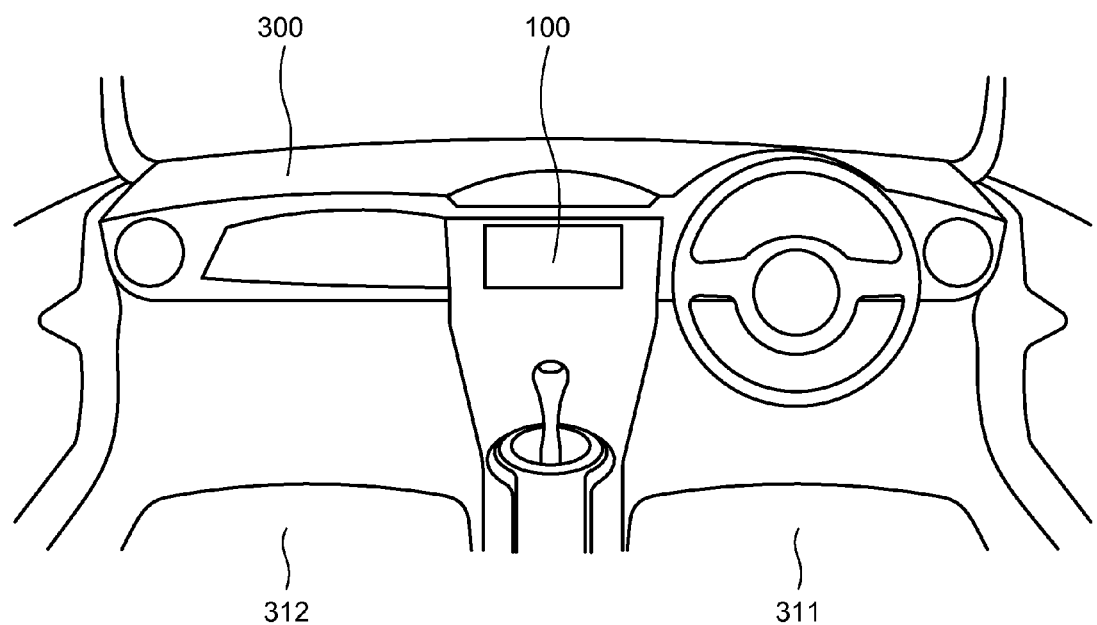
FIG. 8 is a diagram illustrating an example of a device including the electronic apparatus according to the embodiment.
Figure 9:
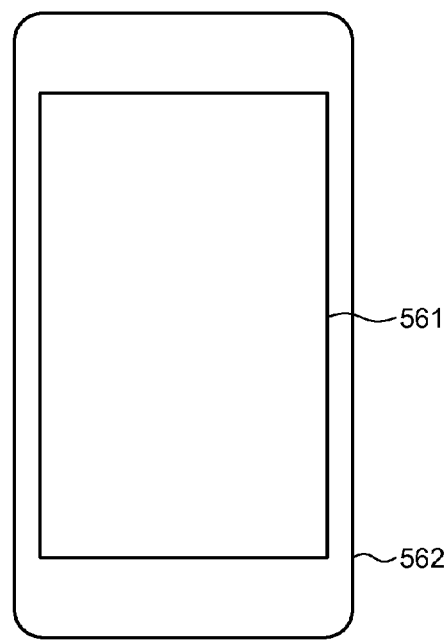
FIG. 9 is a diagram illustrating an example of a device including the electronic apparatus according to the embodiment.

Next, the following describes an application example of the electronic component 11 described in the embodiment with reference to FIGS. 8 and 9. FIGS. 8 and 9 are diagrams illustrating an example of a device including the electronic apparatus 100 according to the embodiment. The electronic component 11 according to the embodiment can be applied to electronic apparatuses in various fields such as a vehicle navigation system illustrated in FIG. 8, a television apparatus, a digital camera, a notebook-type personal computer, a portable electronic apparatus such as a cellular telephone illustrated in FIG. 9, or a video camera. In other words, the electronic component 11 according to the embodiment can be applied to electronic apparatuses in various fields that display a video signal input from the outside or a video signal generated inside as an image or video. The electronic component 11 is coupled to a control device that supplies a video signal and controls an operation of the electronic component 11 as a display device via the FPC 20.

An electronic apparatus illustrated in FIG. 8 is a vehicle navigation device to which the electronic component 11 according to the embodiment is applied. The electronic component 11 is installed in a dashboard 300 inside an automobile. Specifically, the electronic component 11 is installed in the dashboard 300 between a driver's seat 311 and a passenger seat 312. The electronic component 11 of the vehicle navigation device is used to display navigation, to display a music operation screen, to play back and display a movie, or the like.

An electronic apparatus illustrated in FIG. 9 is a portable information terminal that includes the electronic component 11 according to the embodiment and operates as a portable computer, a multifunctional mobile phone, a mobile computer capable of making a voice call, or a mobile computer capable of performing communications, which may be called a smartphone or a tablet terminal. The portable information terminal includes a display unit 561 on a surface of a housing 562, for example. The display unit 561 is the electronic component 11 according to the embodiment having a display function and a touch detecting (what is called a touch panel) function that can detect an external proximity object.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electronic apparatus comprising:
   an electronic component;
   a housing that has an accommodation space for accommodating the electronic component, and has an opening communicating with the accommodation space, the opening being provided at part of an outer member enclosing the accommodation space;
   a covering member that covers the opening and is in intimate contact with the outer member of the housing at a position enclosing the entire outer circumference of the opening and that has a slit provided at a position opposed to the opening; and
   a flexible printed circuit board including a first end and a second end, the first end being positioned inside the accommodation space, the second end being drawn out to the outside of the accommodation space through the slit, wherein
   the covering member comprises a first bonding layer including an opening at a position opposed to the opening of the outer member, and a protective film that is bonded to a surface opposite to a surface being in contact with the outer member of the first bonding layer and closes the opening of the first bonding layer, and
   the slit is provided to the protective film disposed at a position opposed to the opening of the first bonding layer.

2. The electronic apparatus according to claim 1, wherein the covering member is made of a flexible member.

3. The electronic apparatus according to claim 1, wherein the slit is shaped in an H-shape.

4. The electronic apparatus according to claim 1 further comprising an edge cover, the edge cover covering at least part of an edge of the opening on a second surface opposite to a first surface that is in contact with the covering member of the outer member.

5. The electronic apparatus according to claim 4, further comprising a second bonding layer that is disposed on a first surface of the edge cover and bonds part of the flexible printed circuit board disposed inside the accommodation space to the edge cover such that the part of the flexible printed circuit board is fixed onto the edge cover, a second surface of the edge cover opposite to the first surface of the edge cover being in contact with the outer member.

6. An electronic apparatus comprising:
   an electronic component;
   a housing that has an accommodation space for accommodating the electronic component, and has an opening communicating with the accommodation space, the opening being provided at part of an outer member enclosing the accommodation space;
   a covering member that covers the opening and is in intimate contact with the outer member of the housing at a position enclosing the entire outer circumference of the opening and that has a slit provided at a position opposed to the opening;
   a flexible printed circuit board including a first end and a second end, the first end being positioned inside the accommodation space, the second end being drawn out to the outside of the accommodation space through the slit,
   an edge cover, the edge cover covering at least part of an edge of the opening on a second surface opposite to a first surface that is in contact with the covering member of the outer member, and
   a bonding layer that is disposed on a first surface of the edge cover and bonds part of the flexible printed circuit board disposed inside the accommodation space to the edge cover such that the part of the flexible printed circuit board is fixed onto the edge cover, a second surface of the edge cover opposite to the first surface of the edge cover being in contact with the outer member.

* * * * *